(12) United States Patent
Zajkowski

(10) Patent No.: US 8,212,404 B2
(45) Date of Patent: Jul. 3, 2012

(54) METHOD AND APPARATUS FOR MAINTAINING UNINTERRUPTIBLE POWER SUPPLIES

(75) Inventor: Richard J. Zajkowski, Powell, OH (US)

(73) Assignee: Liebert Corporation, Columbus, OH (US)

( * ) Notice: Subject to any disclaimer, the term of this patent is extended or adjusted under 35 U.S.C. 154(b) by 73 days.

(21) Appl. No.: 12/984,924

(22) Filed: Jan. 5, 2011

(65) Prior Publication Data

US 2011/0101785 A1 May 5, 2011

Related U.S. Application Data

(63) Continuation of application No. 11/955,368, filed on Dec. 12, 2007, now Pat. No. 7,888,816.

(60) Provisional application No. 60/942,404, filed on Jun. 6, 2007.

(51) Int. Cl.
*H02H 5/00* (2006.01)
*H02H 5/10* (2006.01)

(52) U.S. Cl. ........................................... 307/64
(58) Field of Classification Search ............... 307/64
See application file for complete search history.

(56) References Cited

U.S. PATENT DOCUMENTS

| | | | |
|---|---|---|---|
| 4,295,053 A * | 10/1981 | Kovatch et al. | 307/64 |
| 5,023,469 A * | 6/1991 | Bassett et al. | 307/64 |
| 5,081,367 A | 1/1992 | Smith et al. | |
| 5,514,915 A | 5/1996 | Kim et al. | |
| 5,581,133 A * | 12/1996 | Smith et al. | 307/64 |
| 5,646,459 A | 7/1997 | Hatate et al. | |
| 5,811,960 A | 9/1998 | Van Sickle et al. | |
| 5,914,467 A * | 6/1999 | Jonas et al. | 200/1 R |
| 6,134,124 A | 10/2000 | Jungreis et al. | |
| 6,198,176 B1 | 3/2001 | Gillette | |
| 6,292,379 B1 | 9/2001 | Edevold et al. | |
| 6,396,170 B1 | 5/2002 | Laufenberg et al. | |
| 6,700,351 B2 | 3/2004 | Blair et al. | |
| 6,960,843 B2 | 11/2005 | Yamamoto | |
| 6,977,446 B2 | 12/2005 | MacKay | |
| 6,995,327 B1 | 2/2006 | Shepstone et al. | |
| 7,105,949 B2 | 9/2006 | Wang et al. | |
| 7,142,950 B2 | 11/2006 | Rasmussen et al. | |
| 7,265,458 B2 | 9/2007 | Edelen et al. | |
| 7,274,112 B2 | 9/2007 | Hjort et al. | |
| 7,418,314 B2 | 8/2008 | Rasmussen et al. | |
| 7,446,433 B2 | 11/2008 | Masciarelli et al. | |
| 7,446,437 B2 | 11/2008 | Paik et al. | |
| 7,450,406 B2 | 11/2008 | Glauser | |
| 7,453,235 B2 | 11/2008 | Blair et al. | |
| 7,456,518 B2 | 11/2008 | Hjort et al. | |
| 7,485,988 B2 | 2/2009 | Lin et al. | |
| 7,566,988 B2 | 7/2009 | Heber et al. | |
| 2003/0184160 A1 | 10/2003 | Yamamoto | |
| 2003/0205939 A1 | 11/2003 | Crosman, III et al. | |
| 2005/0036253 A1 | 2/2005 | Tian et al. | |
| 2005/0043859 A1 | 2/2005 | Tsai et al. | |
| 2006/0043797 A1 | 3/2006 | Hjort et al. | |
| 2006/0138867 A1 | 6/2006 | Tian et al. | |
| 2006/0220462 A1 | 10/2006 | O'Leary | |
| 2006/0221523 A1 | 10/2006 | Colombi et al. | |
| 2006/0288826 A1 | 12/2006 | Arai et al. | |

* cited by examiner

*Primary Examiner* — Adi Amrany
(74) *Attorney, Agent, or Firm* — Locke Lord LLP

(57) ABSTRACT

A system and method of isolating an uninterruptible power supply system is disclosed that comprises bypassing an inverter section of the power supply to couple primary power to a load bus; and, thereafter, isolating the power supply by simultaneously uncoupling the power supply from the load bus and coupling the primary power to the load bus.

20 Claims, 5 Drawing Sheets

METHOD AND APPARATUS FOR MAINTAINING UNINTERRUPTIBLE POWER SUPPLIES

CROSS REFERENCE TO RELATED APPLICATIONS

This application is a continuation application of and claims benefit of and priority to U.S. patent application Ser. No. 11/955,368 filed on Dec. 12, 2007, which is a non-provisional application of and claims benefit of and priority to U.S. Provisional Patent Application Ser. No. 60/942,404 filed on Jun. 6, 2007. The entire contents of both of which are incorporated herein by specific reference. U.S. patent application Ser. No. 11/955,368 issued as U.S. Pat. No. 7,888,816 on Feb. 15, 2011.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to uninterruptible power supplies; and, more specifically, relate to paralleled, multi-moduled uninterruptible power supplies.

2. Description of the Related Art

Uninterruptible power supplies (UPSs) are employed in an ever-increasing variety of situations where a constant source of power is desired. A typical UPS includes a rectifier section that converts alternating current energy ("AC") into direct current energy ("DC"). The rectifier section is configured to be coupled to an AC power source, such as a public utility. An inverter section is coupled to the rectifier section and converts DC energy into AC energy, and thereby provides AC energy at an output of the UPS. The UPS may further include, or be coupled to, a backup source of power, such as a battery bank that can feed either AC or DC energy to the UPS when the primary power source is off-line or when the rectifier/inverter sections are disabled.

UPSs also typically include a bypass circuit to bypass the rectifier/inverter sections and couple the primary AC power source directly to the output bus of the UPS. The bypass circuit, which may be a static switch, can be used, for example, to provide an economy mode of operation and/or to provide power to the load when either or both of the rectifier or inverter sections are damaged or inoperative.

It is known that UPS bypass circuits may create problems in applications using multiple UPSs in parallel to feed a common load, such as a load bus. For example, if the UPS bypass circuit is closed, energy may be backfed from the common load bus through the closed bypass circuit onto the primary power source or into the UPS' power module.

U.S. Patent Application Publication No. 2005/0288826 purports to disclose a method and apparatus for UPS bypass monitoring and control in which the "status of a bypass source of parallel-connected UPSs is determined from a load share when a loading of the parallel-connected UPSs meets a predetermined criterion. Status of a bypass source of the parallel-connected UPSs is determined from a bypass source voltage when the loading of the parallel-connected UPSs fails to meet the predetermined criterion. The loading may include an aggregate loading, and failure of a bypass source of a UPS may be identified responsive to detecting that a load share of the UPS is less than a predetermined proportion of the aggregate loading. Alternatively, failure of the bypass source may be identified by detecting that a bypass voltage fails to meet a predetermined criterion. Bypass circuits of the UPSs may be controlled responsive to a load share and/or a bypass source voltage."

U.S. Patent Application Publication No. 2006/0221523 purports to disclose "a method for controlling an uninterruptible power supply (UPS) for servicing a load. The UPS has a bypass feed path operable in parallel with an inverter feed path, the bypass feed path being engagable with the load via a first switch, and the inverter feed path and being engagable with the load via a second switch. The method includes: generating a paralleling detection signal indicative of the bypass feed path operating to service the load in parallel with the inverter feed path; and, in response to the presence of the paralleling detection signal, modifying a control signal to an inverter such as to drive toward equalization the bypass current and the inverter current. As a result, and in response to the two paths operating to service the load in parallel, the method tends to cancel circulation current generated between the bypass feed path and the inverter feed path."

U.S. Patent Application Publication No. 2003/0184160 purports to disclose a parallel operation method for an uninterruptible power supply apparatus, "the method being also capable of conducting a parallel non-redundancy operation of uninterruptible power supply apparatuses and having a bypass circuit incorporated therein without using an additional common circuit. In the parallel operation method for uninterruptible power supply apparatus of operating in parallel a plurality of uninterruptible power supply apparatuses, each having two operational modes including a bypass feeding mode and an inverter feeding mode, an off instruction for the AC switch is produced in the respective uninterruptible power supply apparatuses which are operated in parallel. The off instruction is produced based on a detection result showing coincidence of a pattern of (pattern coincidence detecting circuits 1002, 2002) the bypass feeding signal which is active during the bypass feeding state and a pattern of a ready signal which becomes active when the inverter feeding is ready for conducting."

The inventions disclosed and taught herein are directed to an improved method and apparatus for bypassing the rectifier/inverter sections of a UPS and/or the entire UPS system for purposes of performing maintenance on the UPS or discrete components of the UPS.

BRIEF SUMMARY OF THE INVENTION

In one aspect of the invention, a method of isolating an uninterruptible power supply system is provided that comprises bypassing an inverter section of the power supply to couple primary power to a load bus; and, thereafter, isolating the power supply by simultaneously uncoupling the power supply from the load bus and coupling the primary power to the load bus.

A further aspect of the invention comprises, an uninterruptible power supply system having an uninterruptible power supply comprising a power module coupled to a first power source and an internal bypass circuit coupled to a second power source, both of the power module and the internal bypass selectively couplable to a load bus; a system bypass circuit coupled to either the first or second power source and selectively couplable to the load bus; and means for sequencing the system bypass circuit so that the system bypass circuit is coupled to the load only after the internal bypass is coupled to the load bus.

Other and further aspects of the invention, including various embodiments, will become apparent upon reading the following detailed disclosure.

DETAILED DESCRIPTION

Figure 1:
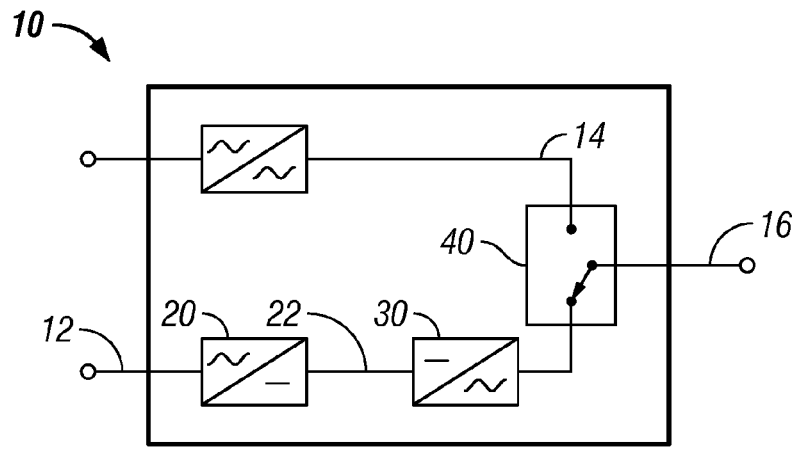
FIG. 1 illustrates certain functional and structural aspects of an UPS suitable for use with the present invention.

The Figures described above and the written description of specific structures and functions below are not presented to limit the scope of what I have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Computer programs for use with or by the embodiments disclosed herein may be written in an object-oriented programming language, conventional procedural programming language, or lower-level code, such as assembly language and/or microcode. The program may be executed entirely on a single processor and/or across multiple processors, as a stand-alone software package or as part of another software package.

Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

The inventions disclosed and taught herein comprise systems and methods of controlling one or more UPSs by providing a system bypass circuit in addition to any internal bypass associated with each UPS. Closing the system bypass circuit allows the one or more UPSs to be serviced or otherwise taken off line. The systems and methods may comprise placing each UPS into internal bypass prior to placing the UPS system into system bypass. Further, the systems and methods may comprise automatic bypassing and/or restricted bypassing as desired, such as by forcing one or more of the UPSs to go into internal bypass when one or more covers are removed. Additionally or alternately, engaging the system bypass feature may require that one or more of the individual UPSs is placed in internal bypass first. While there are an infinite number of embodiments that utilize one or more of these inventions, a few specific embodiments are discussed below.

FIG. 1 illustrates a conventional UPS 10 comprising a power module having a rectifier section 20 and an inverter section 30. It will be understood that a primary power source (not shown), such as line utility, may supply the UPS at primary input 12. The Primary AC power is rectified to DC power, which is communicated, such as by a DC bus 22, to the inverter section 30, where the DC power is inverted to a form of AC power. Not shown in FIG. 1 is a back up power source, such as one or more batteries, that can feed the inverter section 30 when the primary power source is offline. Also illustrated in FIG. 1 is internal bypass 14, which, as the name implies, bypasses the power module 20, 30 of the UPS. The internal bypass 14 is structured to communicate AC power, such as from the primary power source (or a secondary power source), to power output 16 of the UPS. Also illustrated in FIG. 1 is switch 40 that allows the power output to source from power module 20, 30 (as shown in FIG. 1) or from the internal bypass 14. It will be understood the switch 40 may comprise a mechanical switch, such as a breaker, an electronic switch such as an SCR, or any number of other devices adapted to transfer power as described herein.

Figure 2:
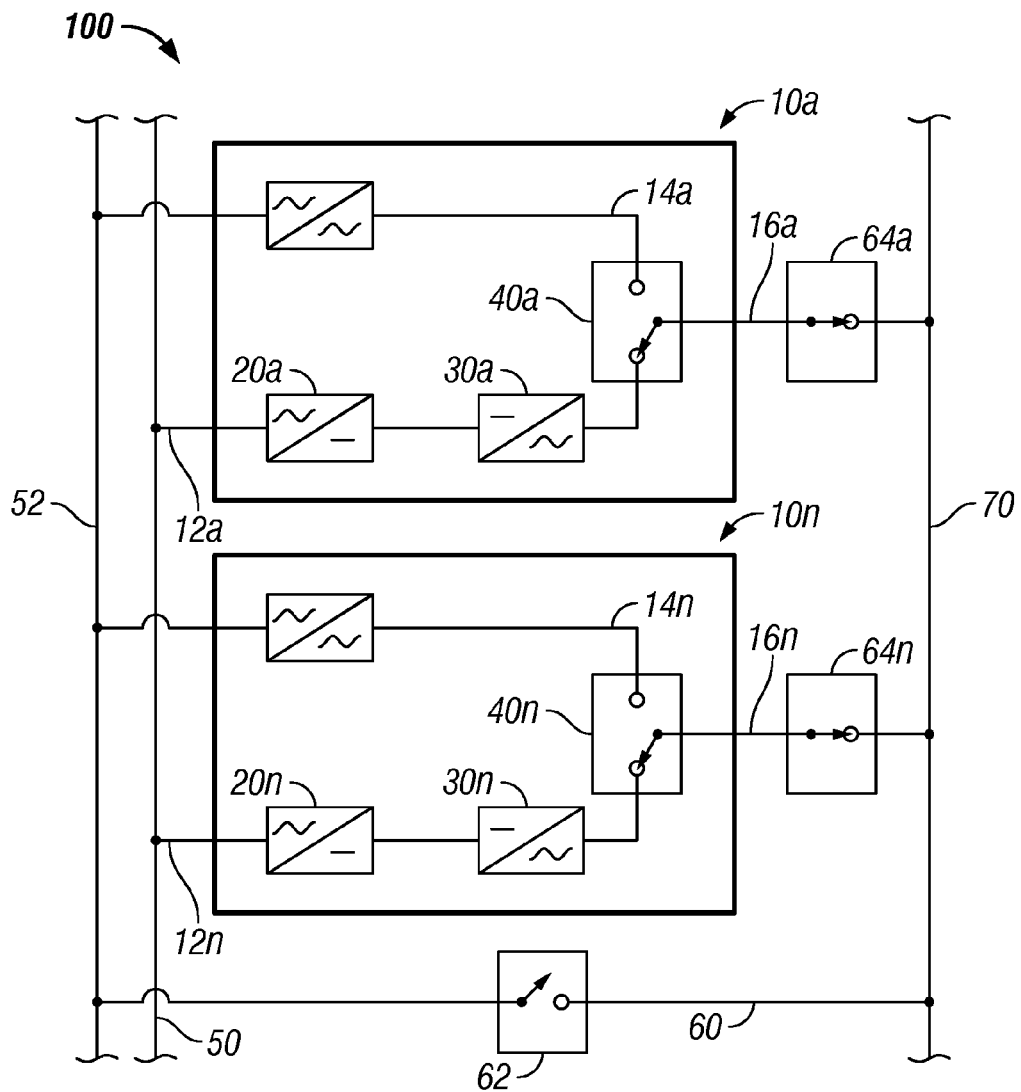
FIG. 2 illustrates paralleled UPSs utilizing a maintenance bypass according the present invention.

Turning now to FIG. 2, a first embodiment of an uninterruptible power supply system 100 utilizing aspects of the present invention is illustrated. A first UPS 10a is shown and another UPS 10n is shown to represent a plurality of paralleled UPSs 10a through 10n. For purposes of this disclosure, UPSs 10a through 10n are illustrated to be identical, but it will be appreciated that non-identical UPSs can be paralleled with the present invention as well. This embodiment of the UPS system 100 shows power input 12a through 12n drawing power from a primary power source 50 and the bypass circuits 14a through 14n drawing power from a bypass power source 52. In certain embodiments and/or applications, the primary power source 50 and bypass power source 52 may comprise the same source, such as a line utility. Illustrated in FIG. 2 is system or maintenance bypass 60 that connects a power source, such as primary power 50 or bypass power 52 to the load bus 70. The system bypass 60 comprises a switch 62, shown in the opened condition. The UPS system 100 also comprises load bus switches 64a through 64n, which are shown in the closed condition. Although the bypass switch 62, and the load bus switches 64a through 64n are illustrated as separate switches, it will be appreciated that a single multi-pole switch, whether mechanical or electronic or a combination thereof, may be used as well. The system of FIG. 2 is shown in the normal operating mode of the UPS system in which power from the primary source 50 is passed through the power modules 20a-n, 30a-n through the load bus switches 64a though 64n and on to the load bus 70. Bypass switch 62 as well as the internal bypass circuits 14a through 14n are in the opened condition.

Figure 3:
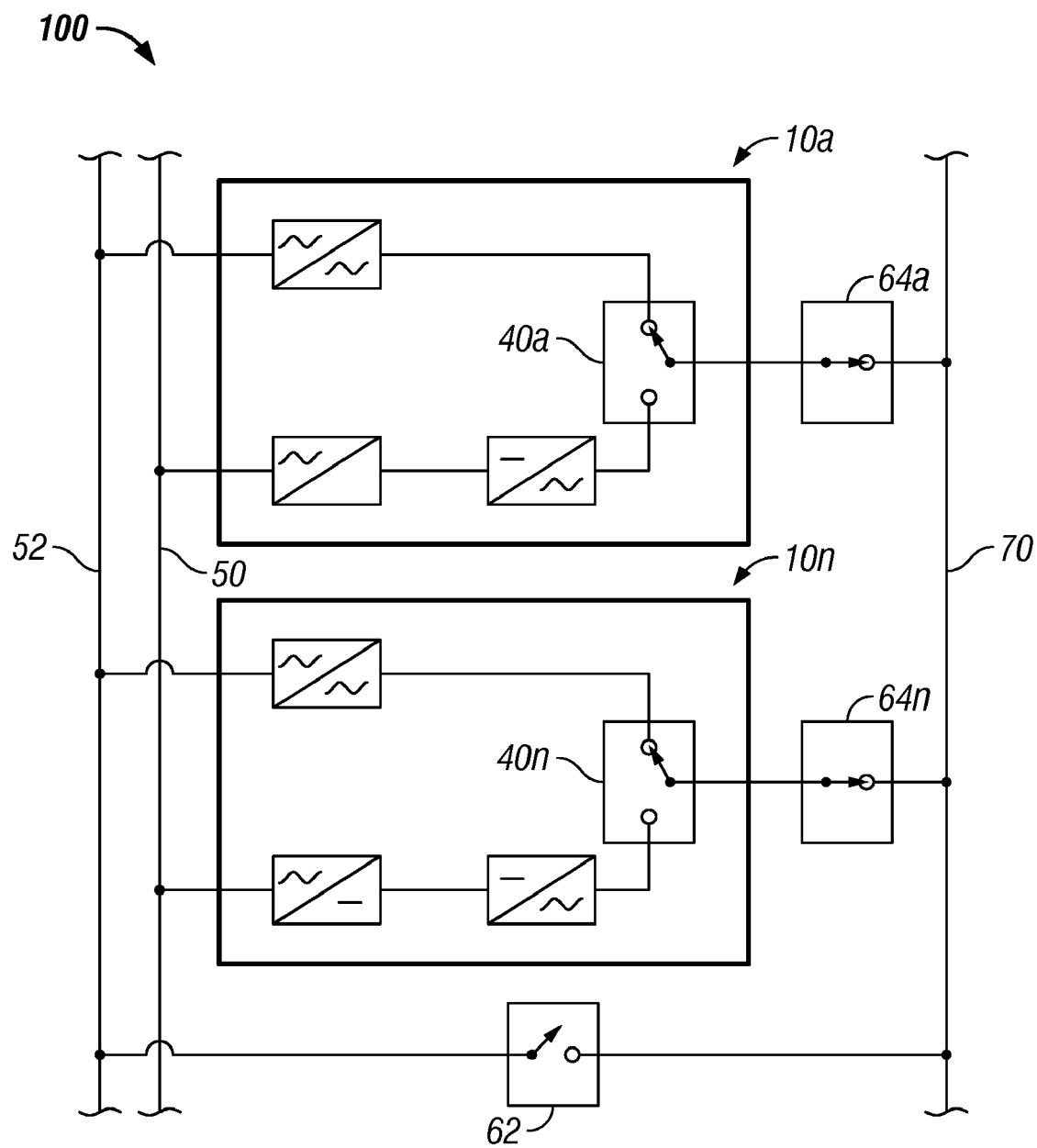
FIG. 3 illustrates the systems of FIG. 2 in which the UPSs have been set to internal bypass.

FIG. 3 illustrates the UPS system 100 in internal bypass mode. As can be seen, UPS switches 40a through 40n have been activated such that the power modules of the paralleled UPS have been bypassed. Power from the bypass power source 52 (which may be the same as primary power source 50) is passed through to the load bus 70 via load bus switches 64a through 64n. Activation of the UPS switches 40a through 40n may be accomplished by any known means, including wired or wireless activation or mechanical activation, remotely or directly.

Figure 4:
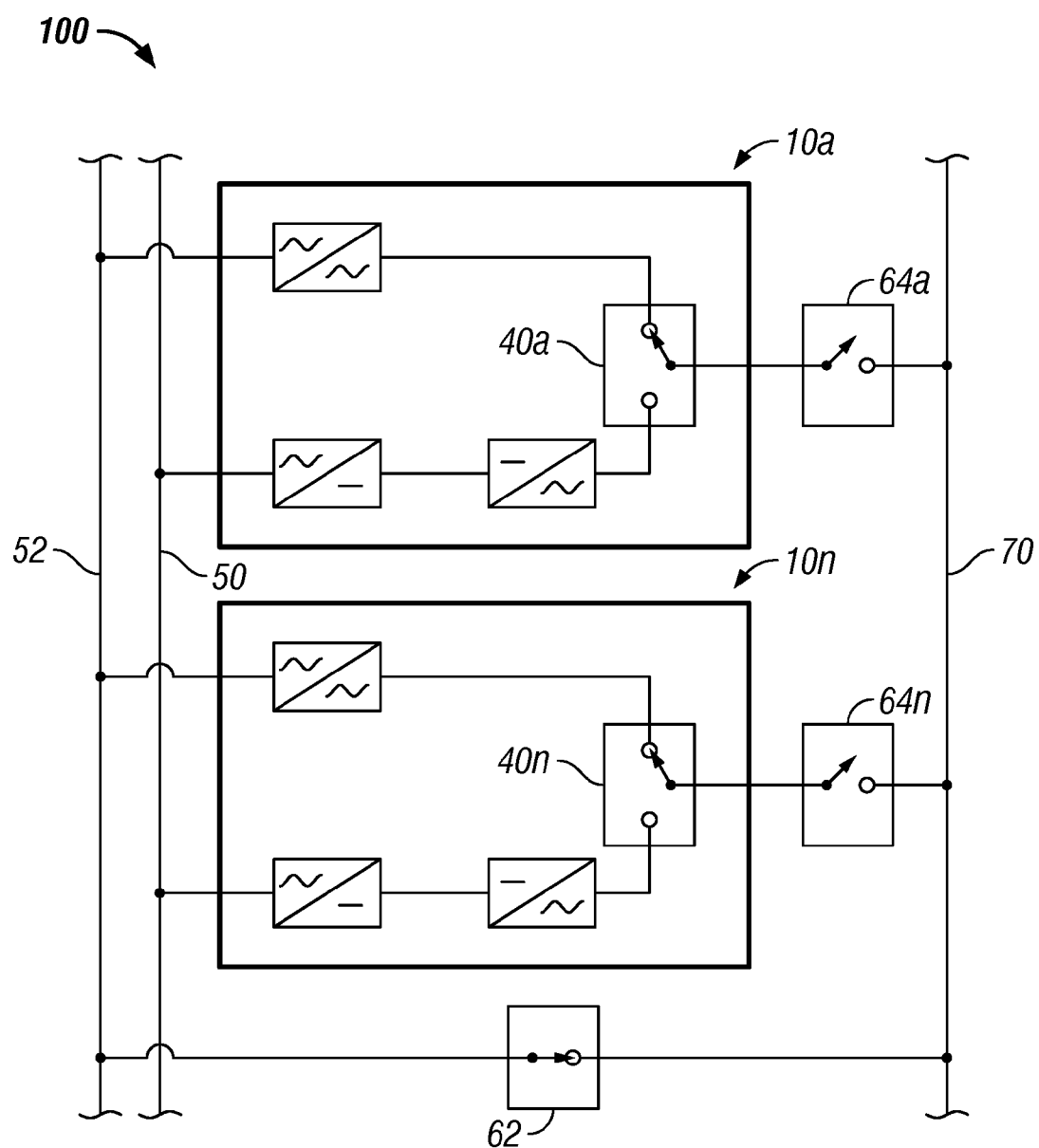
FIG. 4 illustrates the system of FIG. 2 in which the system has been set to maintenance bypass.

FIG. 4 illustrates the UPS system 100 in system bypass mode. As can be seen, UPS switches 40a through 40n have been activated such that the power modules of the paralleled UPS have been bypassed. Thereafter, system switch 62 and load bus switches 64a through 64n are closed and opened, respectively, simultaneously or substantially simultaneously so that power on the load bus 70 is substantially uninterrupted. In this condition, power from the bypass power source 52 (which may be the same as primary power source 50) is passed through to the load bus 70 via bypass switch 62 thereby bypassing all of the paralleled UPSs, including their power modules 20a-n, 30 a-n. Activation of the system switch 62 and the load bus switches 64a through 64n may be accomplished by any known means, including wired or wireless activation or mechanical activation, remotely or directly.

It will be appreciated that once the UPS system illustrated in FIG. 4 is placed in system bypass mode, one or more bypassed UPSs may be removed or otherwise serviced. It will also be appreciated that by requiring each targeted UPS, such as UPSs 10a through 10n, to be placed into internal bypass prior to engaging the system bypass 12, potentially damaging or harmful back feed is thereby prevented or minimized.

Figure 5A:
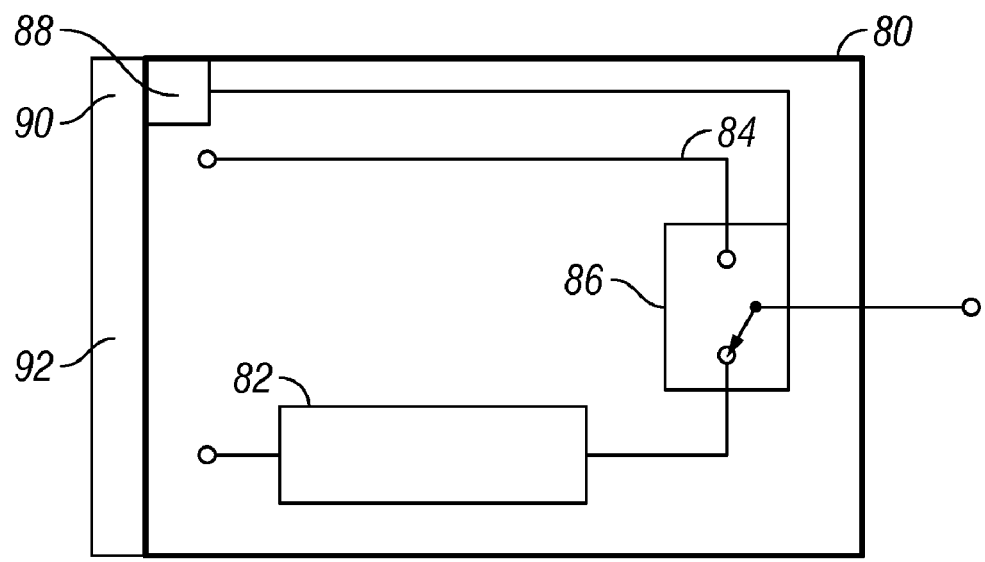
FIGS. 5a and 5b illustrate a UPS for use with the present invention having an automatic internal bypass feature.
Figure 5B:
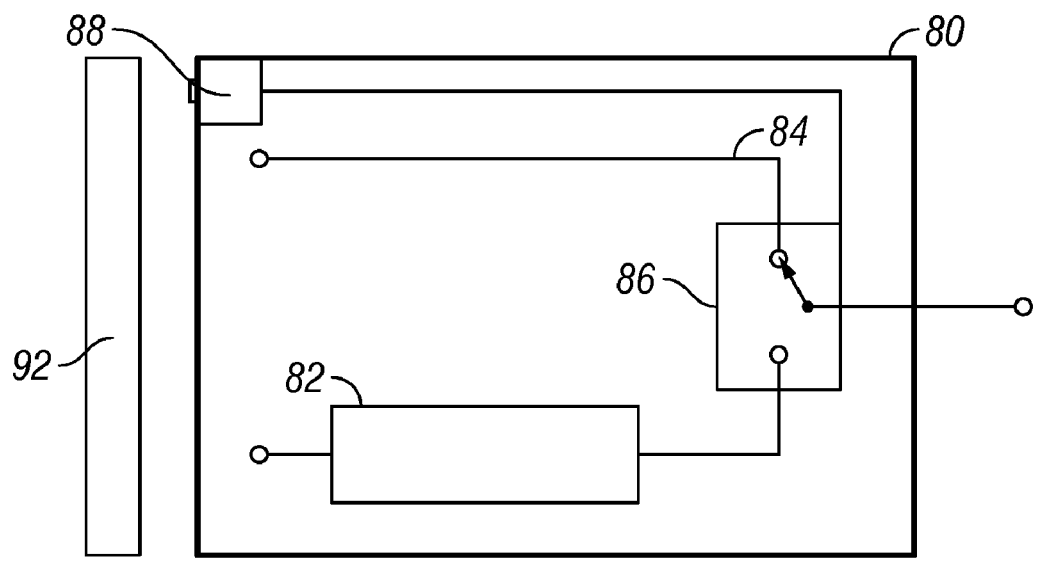

FIGS. 5a and 5b illustrate aspects of a preferred UPS for use with the present inventions. UPS 80 comprises a power module 82 (comprising a rectifier section and an inverter section), an internal bypass 84 and a UPS switch 86, as discussed previously. In addition, UPS 80 comprises one or more contacts or switches 88, such as mechanical micro-switches, adjacent selected covers or panels 90. The switch 88 communicates with UPS switch 86 so that a change in state of switch 88 causes a change in state of UPS switch 86. For example, a switch 88 may be placed adjacent a primary access panel 92, such that removal of the panel by, for example, a service technician, causes a change in state of switch 88, such as from opened to closed or vice versa. This change in state is communicated, preferably electronically, to UPS switch 86, which causes switch 86 to change state correspondingly. In a preferred embodiment of UPS 80, removing the panel 92 causes the UPS switch to place the UPS 80 into bypass mode, as illustrated in FIG. 5b.

Figure 6:
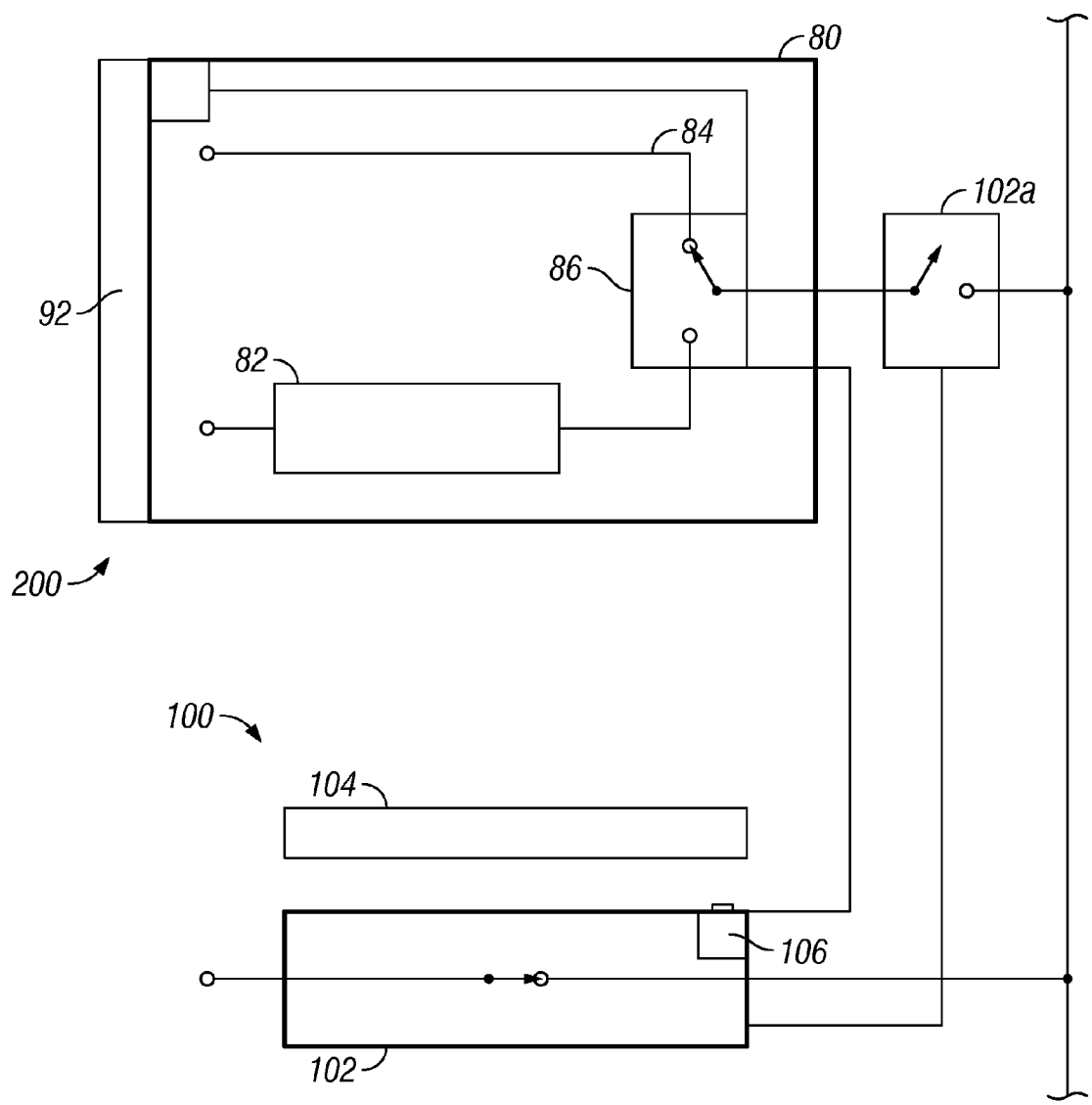
FIG. 6 illustrates a UPS system having a maintenance bypass with an automatic internal bypass feature.

FIG. 6 illustrates a preferred UPS system 200 comprising a plurality of paralleled UPSs 80 (only one shown for clarity) such as described above with respect to FIG. 5. FIG. 6 also illustrates system bypass 100 comprising a switch 102, such as described previously. The system bypass switch 102 may preferably comprise a mechanical breaker switch having multiple poles corresponding to the number of paralleled UPSs. In this configuration, the system switch 102 also comprises load bus switches 102a through 102n (not shown). It will be appreciated that the system switch 102 may be adapted such that when switch 102 is open, the load bus switches 102a-n are closed, and vice versa. Also shown in FIG. 6 is system switch interlock 104, which may comprise a bar, panel, or other physical structure that impedes or prevents actuation of system switch 102. The system bypass is also disclosed to comprise an interlock switch 106, such as mechanical micro-switch. When the interlock 104 is moved or removed, the switch 106 changes state and causes the UPS switches 86a through 86n (not shown) to enter the internal bypass condition. Thereafter, actuation of the system bypass switch 102 cause the UPS to go into system bypass without producing damaging backfeed on the UPS power modules.

Other and further embodiments utilizing one or more aspects of the inventions described above can be devised without departing from the spirit of my invention. For example, a suitable programmed controller can stage the internal bypass functions followed by the system bypass function. Further, the various methods and embodiments of the present invention can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by me, but rather, in conformity with the patent laws, I intend to fully protect all such modifications and improvements that come within the scope or range of equivalent of the following claims.

What is claimed is:

1. A method of isolating an uninterruptible power supply (UPS) system comprising:
   moving a physical interlock from a first position, in which the interlock physically prevents actuation of a system bypass, to a second position in which the system bypass may be actuated;
   bypassing an inverter section of the UPS to couple primary power to a load bus, internally to the UPS, in response to movement of the interlock; and, thereafter,
   isolating the UPS by simultaneously uncoupling the UPS from the load bus and coupling the primary power to the load bus, externally to the UPS;

wherein the interlock is a panel on the UPS and removal of the panel electronically triggers bypassing of the inverter section.

2. The method of claim 1, wherein bypassing the inverter section also comprises bypassing a rectifier section of the UPS.

3. The method of claim 2, wherein bypassing the inverter and rectifier sections comprises activating an internal bypass switch that uncouples the inverter and rectifier sections from the load bus and couples an internal bypass circuit to the load bus.

4. The method of claim 3, wherein the internal bypass circuit is coupled to a different primary power source with respect to the inverter section.

5. The method of claim 1, wherein isolating the UPS comprises activating a system bypass switch that uncouples an internal bypass circuit from the load bus and substantially simultaneously couples a system bypass circuit to the load bus.

6. The method of claim 5, wherein the system bypass circuit is coupled to a different primary power source with respect to the inverter section.

7. The method of claim 5, wherein the system bypass circuit is coupled to a different primary power source with respect to the internal bypass.

8. The method of claim 5, wherein disabling the physical interlock causes an internal bypass switch to be activated.

9. The method of claim 5, wherein the internal bypass circuit is coupled to the same primary power source as the inverter section.

10. The method of claim 5, wherein the internal bypass circuit is coupled to a different primary power source with respect to the inverter section.

11. The method of claim 5, wherein the system bypass circuit is coupled to the same primary power source as the inverter section.

12. The method of claim 5, wherein the system bypass circuit is coupled to a different primary power source with respect to the inverter section.

13. The method of claim 5, wherein the system bypass circuit is coupled to the same primary power source as the internal bypass.

14. The method of claim 5, wherein the system bypass circuit is coupled to a different primary power source with respect to the internal bypass.

15. The method of claim 1, wherein bypassing the inverter section comprises removing a panel on the power supply.

16. The method of claim 1, further comprising the steps of;
supplying power from a first power source through the UPS to the load, before isolating the UPS; and
supplying power from a second power source to the load, bypassing the UPS, after isolating the UPS.

17. The method of claim 16, wherein the first power source and the second power source are the same.

18. The method of claim 1, wherein the method is performed simultaneously with two or more UPSs, such that two or more UPSs are simultaneously isolated.

19. The method of claim 1, wherein:
bypassing an inverter section of the UPS comprises activating an internal bypass switch, within the UPS, that uncouples the inverter section from the load bus and couples an internal bypass circuit, within the UPS, to the load bus; and
isolating the UPS comprises activating a system bypass switch, external to and independent from the UPS, that uncouples the internal bypass circuit from the load bus and substantially simultaneously couples a system bypass circuit, external to and independent from the UPS, to the load bus.

20. The method of claim 1, wherein the method comprises isolating a plurality of UPSs, with each UPS having an internal bypass, using a single system bypass.

* * * * *